United States Patent
Yamamoto

(10) Patent No.: US 7,197,945 B2
(45) Date of Patent: Apr. 3, 2007

(54) TORQUE DIRECTION DETECTING DEVICE FOR BRUSHLESS MOTOR

(75) Inventor: Toshihisa Yamamoto, Anjo (JP)

(73) Assignee: DENSO Corporation, Kariya (JP)

( * ) Notice: Subject to any disclaimer, the term of this patent is extended or adjusted under 35 U.S.C. 154(b) by 51 days.

(21) Appl. No.: 11/049,215

(22) Filed: Feb. 2, 2005

(65) Prior Publication Data
US 2005/0166686 A1 Aug. 4, 2005

(30) Foreign Application Priority Data
Feb. 2, 2004 (JP) ............................ 2004-025573

(51) Int. Cl.
*G01L 3/02* (2006.01)
(52) U.S. Cl. ................................ 73/862.326
(58) Field of Classification Search ............ 73/862.08, 73/862.326 P
See application file for complete search history.

(56) References Cited

U.S. PATENT DOCUMENTS

| | | | |
|---|---|---|---|
| 4,762,007 A * | 8/1988 | Gasperi et al. ........ | 73/862.326 |
| 4,843,291 A * | 6/1989 | Predina ................ | 318/605 |
| 5,006,768 A * | 4/1991 | Rozman ................ | 318/254 |
| 2003/0151383 A1 | 8/2003 | Hayashi | |

FOREIGN PATENT DOCUMENTS

JP A-2003-235285 8/2003

OTHER PUBLICATIONS

Chinese Office Action for corresponding Japanese Application No. 200510006280.8 dated May 26, 2006.
English translation of Chinese Office Action dated Oct. 20, 2006 issued in the corresponding Chinese application 200510006280.8.

* cited by examiner

*Primary Examiner*—Max Noori
(74) *Attorney, Agent, or Firm*—Harness, Dickey & Pierce, PLC

(57) ABSTRACT

A torque direction detecting device for an electric motor includes a resolver which provides a pair of a sin $\theta$ signal and a cos $\theta$ signal with $\theta$ changing from 0 degree to 360 degrees in electric angle according to rotation of the brushless motor, a circuit which calculates an electric angle of the brushless motor from the sin $\theta$ signal and the cos $\theta$ signal, a current sensor for detecting phase current flowing through the phase windings, a circuit which provides a signal if the phase currents is in a prescribed magnitude relation, a circuit which divides a period of the 360 degree-electric angle into 8 timing sections according to magnitude relation between the sin $\theta$ signal and the cos $\theta$ signal and comparison of the sin $\theta$ signal and the cos $\theta$ signal with 0, and a circuit which determines a torque direction of the brushless motor if the comparison signal is provided in one of prescribed two timing sections each of which has a specific combination of the magnitude relation and the comparison of the sin $\theta$ signal and the cos $\theta$ signal.

5 Claims, 8 Drawing Sheets

FIG. 4
| TIMING SECTION | T1 | T2 | T3 | T4 | T5 | T6 | T7 | T8 |
|---|---|---|---|---|---|---|---|---|
| $\sin\theta > 0$ (Bit0) | 1 | 1 | 1 | 1 | 0 | 0 | 0 | 0 |
| $\cos\theta > 0$ (Bit1) | 1 | 1 | 0 | 0 | 0 | 0 | 1 | 1 |
| $\sin\theta > \cos\theta$ (Bit2) | 0 | 1 | 1 | 1 | 1 | 0 | 0 | 0 |
FIG. 5A
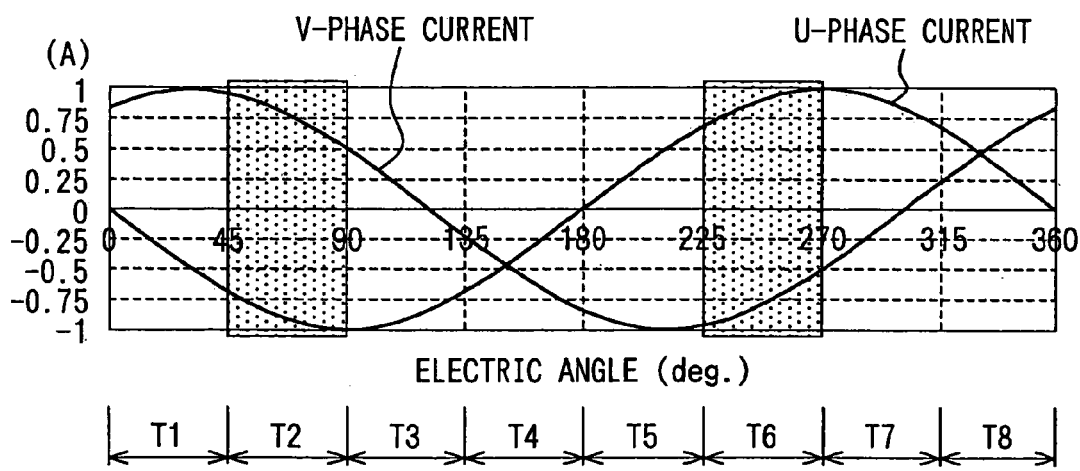
FIG. 5B
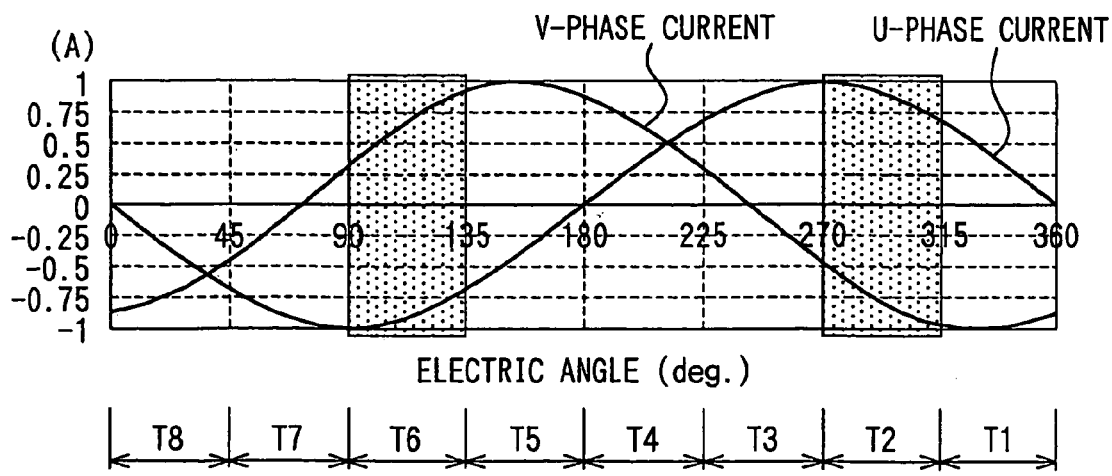

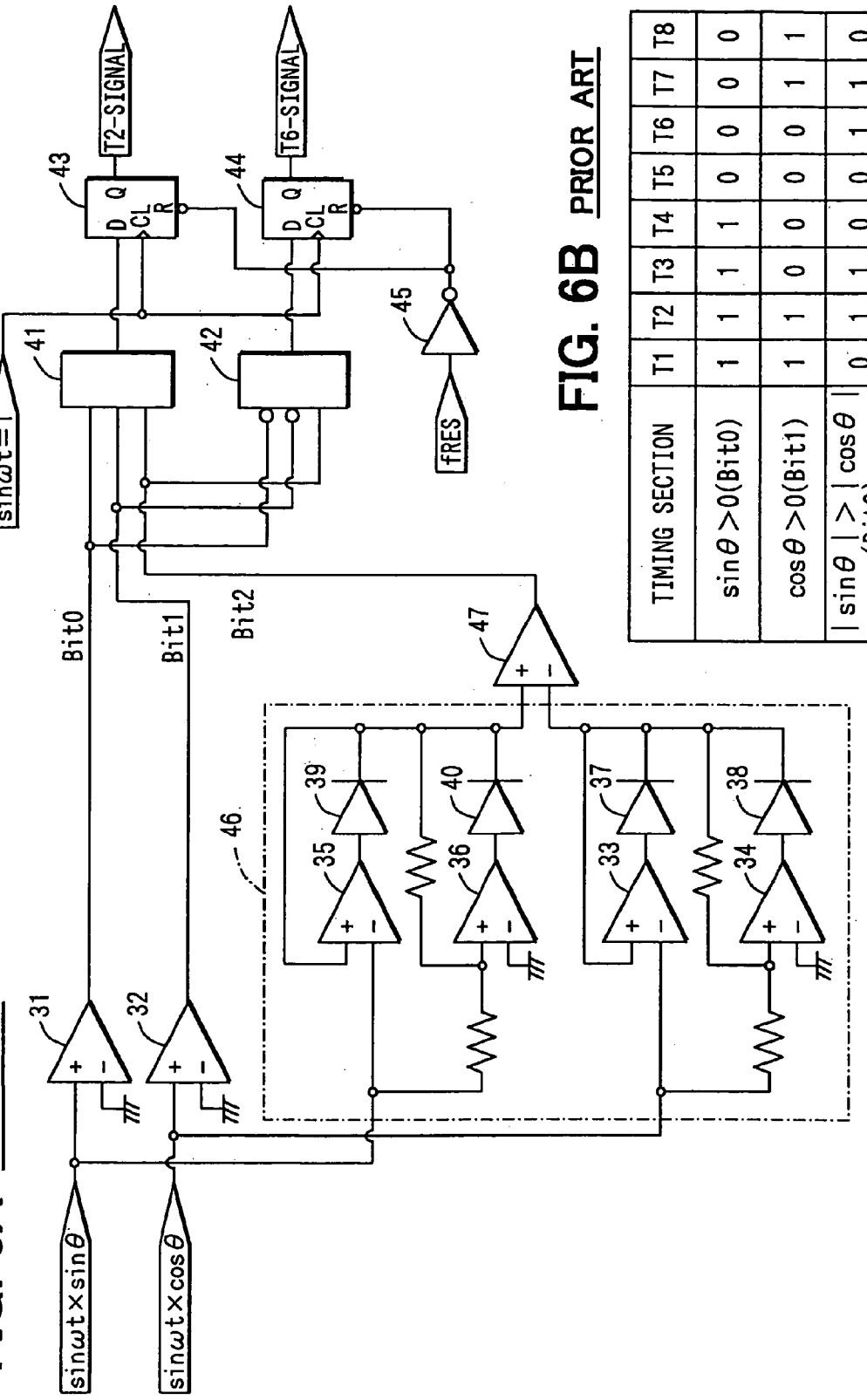

TORQUE DIRECTION DETECTING DEVICE FOR BRUSHLESS MOTOR

CROSS REFERENCE TO RELATED APPLICATION

The present application is based on and claims priority from Japanese Patent Application 2004-025573, filed Feb. 2, 2004, the contents of which are incorporated herein by reference.

BACKGROUND OF THE INVENTION

1. Field of the Invention

The present invention relates to a torque direction detecting device for a brushless motor.

2. Description of the Related Art

A brushless motors has been used in various control systems such as an electric power steering control system because of its simple mechanical structure and excellent controlling performance. In order to drive such a brushless motor, rotation position of the brushless motor's rotor is detected by a rotation position detector such as a resolver, which generates a rotating magnetic field. A control system and a three-phase bridge circuit are provided to drive the brushless motor according to the rotation position signal. The rotation position detector also detects the direction of the rotor torque and an abnormal operation of the brushless motor.

The resolver is a rotary transformer, which has a pair of stator windings and a rotor winding. The pair of stator windings are disposed at positions of a stator that are 90 degrees in mechanical angle different from each other. The rotor winding magnetically interlinks the pair of stator windings to generate a signal whose amplitude is a function of the rotor's rotation position or a rotation angle relative to the stator. Therefore, the resolver generates two kinds of signals, which are modulated by a sine function of the rotation angle of the rotor and a cosine function of the rotation angle of the rotor, based on a field exciting signal that is inputted to the resolver.

JP-A-2003-235285 or its counterpart US-2003-0151383A1 discloses a torque direction detecting device for a brushless motor in which the torque direction is determined according to a difference in amount between two phase currents at a suitable timing that is obtained from the electric angle of the brushless motor, which is based on output signals of a resolver.

When a field exciting signal sin ωt, as shown in FIG. 3A, is inputted to a resolver, a SIN output signal sin θ×sin ωt, as shown in FIG. 3B, and a COS output signal cos θ×sin ωt, as shown in FIG. 3C, are outputted. When sin ωt becomes 1, the SIN signal becomes sin θ and the COS signal becomes cos θ, as shown in FIG. 3D. One cycle or 360 degrees in electric angle of the SIN and COS output signals is divided into 8 sections T1–T8 in such that the electric angle is set 0 when sin θ is 0 and cos θ is 1.

In order to divide the one cycle into 8 timing sections as shown in FIG. 6B, the torque direction detecting device disclosed in JP-A-2003-235285 includes at least five comparators 33–36, 47 for providing one of three Bit signals (e.g. Bit 2) in addition to comparators 31, 32 for providing two Bit signals (e.g. Bit 0, Bit 1), as shown in FIG. 6A, because of generating absolute values. However, these kinds of circuits makes the torque direction detecting device complicated and expensive.

SUMMARY OF THE INVENTION

It is an object of the invention to provide a simple, inexpensive and accurate torque direction detecting device for a brushless motor.

According to a feature of the invention, a torque direction detecting device for a brushless motor includes a resolver for providing two sinusoidal signals having the same cycle and a phase different from each other by a prescribed electric angle according to rotation of the brushless motor, means for calculating an electric angle of the brushless motor from the two sinusoidal signals, a current sensor for detecting motor current flowing through phase windings of the motor, and means for determining a torque direction of the brushless motor by comparing magnitudes of motor currents flowing through two of the phase-windings in a prescribed section of the electric angle.

Therefore, no circuit for generating absolute values is necessary.

The above means for determining a torque direction may include means for comparing magnitudes of the phase currents flowing through two of the phase-windings to provide a signal when a difference in magnitude between the phase currents is in a prescribed magnitude relation. The means for determining a torque direction may further include means for providing a timing signal when the electric angle is in the prescribed section of the electric angle and a logic circuit that provides a signal determining a torque direction when the said means provides the timing signal.

In the torque direction detecting device as above, the means for providing a timing signal may include a comparator circuit that compares magnitudes of the two sinusoidal signals and a circuit for examining whether the electric angle is in the prescribed section or not. The means for comparing magnitudes of phase currents may compare magnitude of relation of the phase currents in only two sections that are 180 degrees in electric angle different from each other.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIGS. 4 is a table showing combinations of signals at various timing sections T1–T8 divided by the timing section detecting unit shown in FIG. 2;

FIGS. 5A and 5B are graphs showing relationship between two phase current waves and electric angles;

FIG. 6 is a schematic block diagram of a timing section detecting unit of a prior art torque direction detecting device;

DETAILED DESCRIPTION OF THE PREFERRED EMBODIMENTS

A torque direction detecting device according to a preferred embodiment of the invention will be described with reference to appended drawings.

Figure 1:
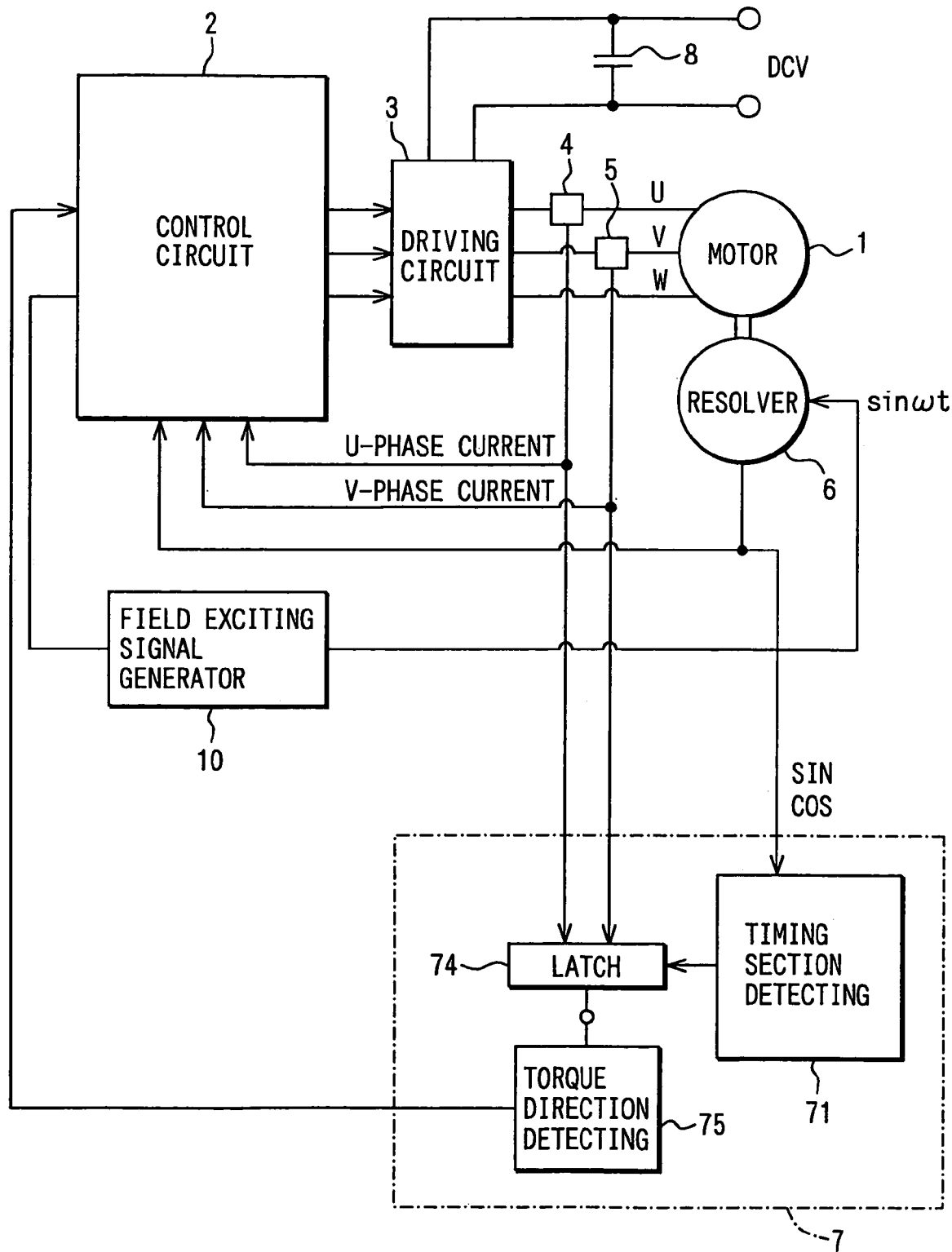
FIG. 1 is a block diagram illustrating a control system for a brushless motor that includes a torque direction detecting device according to a preferred embodiment of the invention.

As shown in FIG. 1, a brushless motor control system includes a brushless motor 1, a control circuit 2, a driving circuit 3 that includes a well-known three-phase inverter, current sensors 4, 5, a resolver 6, the torque direction detecting device 7 and a smoothing capacitor 8, a field exciting signal generator 10, etc.

The control circuit 2 provides three-phase gate control signals. The driving circuit 3 receives the gate control signals at the three-phase inverter and provides three-phase voltage signals, which are supplied to the brushless motor 1.

The resolver 6 includes a rotor fixed to the rotary shaft of the brushless motor 1, a field coil mounted on the rotor, a stator core, a pair of stator windings mounted on the stator core at positions separated at 90 degrees in electric angle from each other. The field coil of the resolver 6 is excited by a sine wave voltage (field exciting signal) V×sin ωt that is provided by the field exciting signal generator 10. The pair of stator windings generates SIN output signal and COS output signals. That is, the voltage of the SIN output signal is Vm×sin ωt×sin θ, and the voltage of COS output signal is Vm×sin ωt×cos θ. The SIN output signal sin ωt×sin θ and the COS output signal sin ωt×cos θ correspond to the voltage of the output signals if Vm is assumed to be 1. The field exciting signal also corresponds to the sine wave voltage sin ωt when V is assumed to be 1.

The field exciting signal is provided by the field exciting signal generator 10 to have a suitable amplitude and is supplied to the resolver 6. Incidentally, the field exciting signal generator 10 may be incorporated in the control circuit 2.

The control circuit 2 is a well-known circuit that includes a microcomputer and its surrounding circuits. The control circuit 2 may be formed from a hardware logic circuit or a digital signal processor. The control circuit 2 forms another phase-current signal (i.e. W-phase current signal) from two phase-current signals (i.e. U-phase and V-phase current signals) that are supplied from the current sensors 4, 5. The control circuit 2 provides six gate-voltage signals having optimum amplitudes and timings to be supplied to the three-phase inverter 3 based on the three phase-currents, the rotation angle signal from the resolver 6 and a command signal from outside.

The torque direction detecting device 7 is connected to the control circuit 2. The torque direction detecting circuit 7 includes a timing section detecting circuit 71, a latch circuit 74 and a torque direction detecting circuit 75. The torque direction detecting circuit 75 is a logic circuit.

Figure 2:
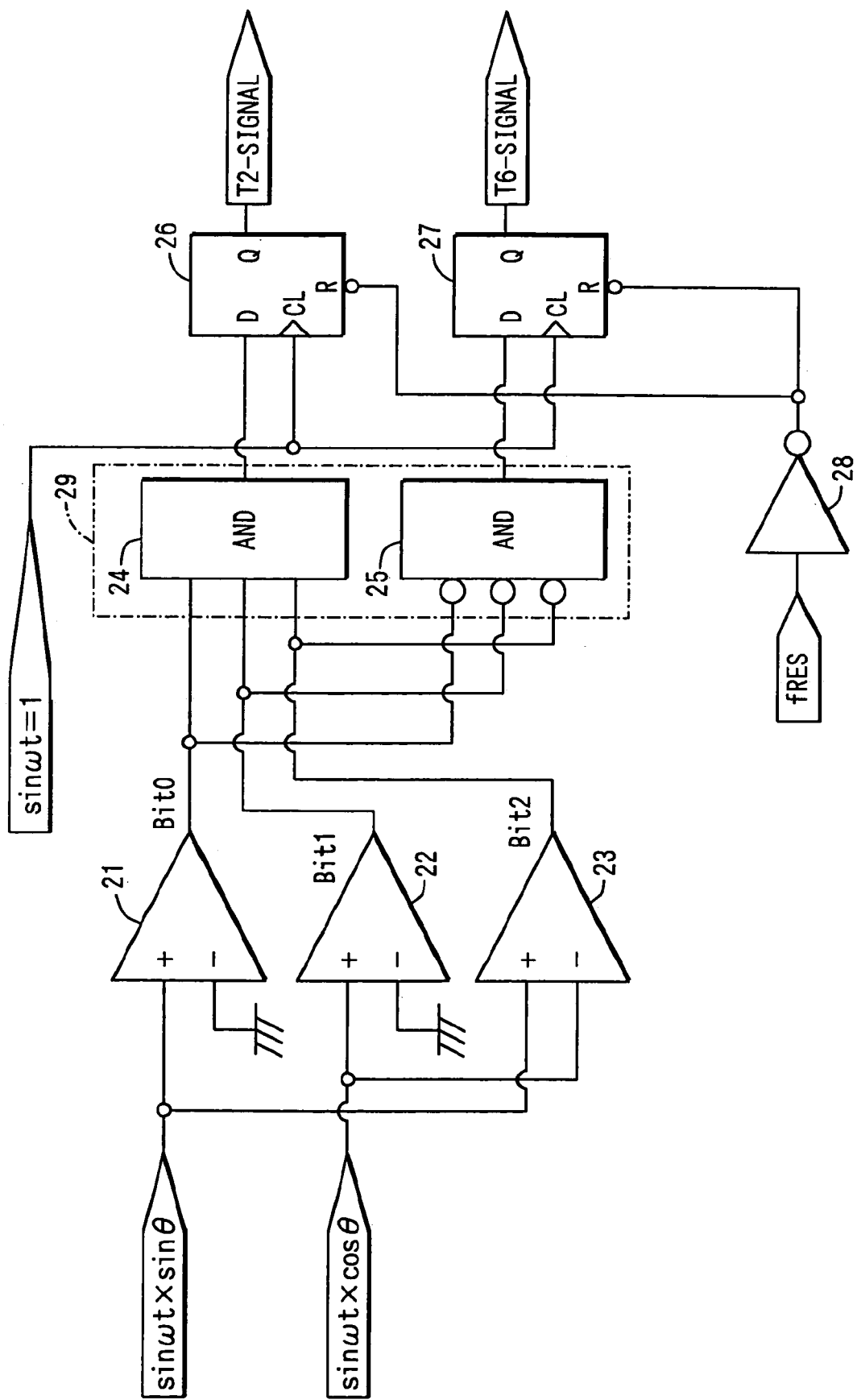
FIG. 2 is a schematic block diagram of a timing section detecting unit of the torque direction detecting device according to a preferred embodiment of the invention.

The timing section detecting circuit 71 includes well-known comparators 21, 22, 23 and AND circuits 24, 25 that respectively have three input terminals, as shown in FIG. 2.

Figure 3A:
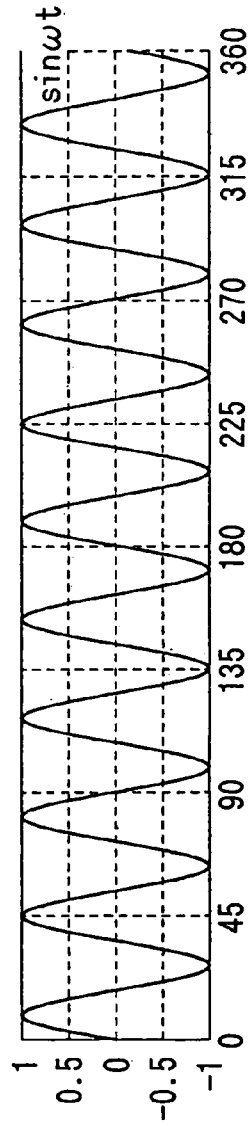
FIGS. 3A–3D are timing charts showing signals at various portions of a resolver.
Figure 3B:
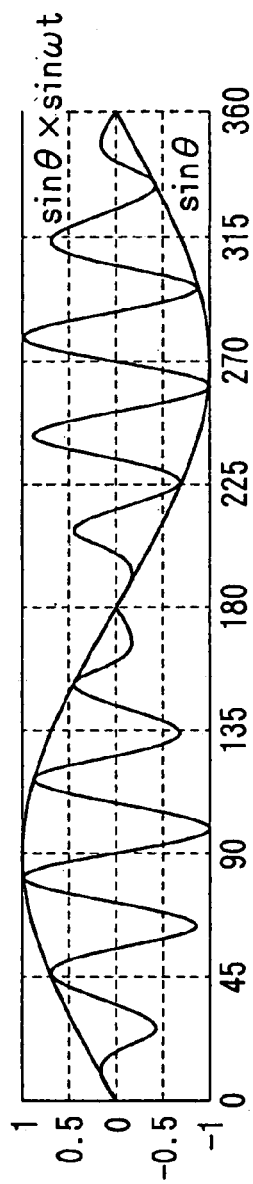
Figure 3C:
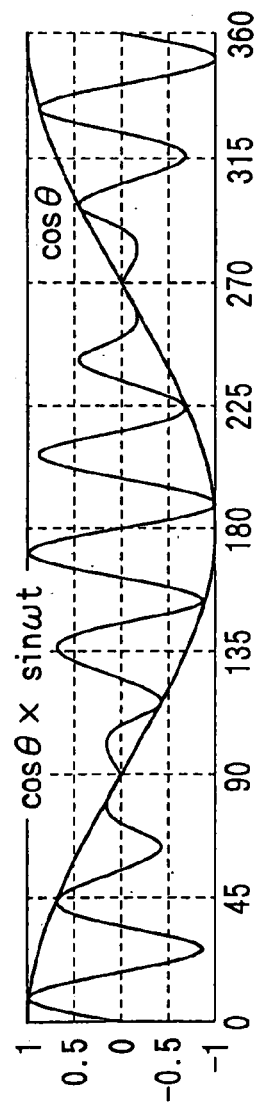

When a field exciting signal, which has a characteristic of sin ωt shown in FIG. 3A, is inputted from the field exciting signal generator 10 to the resolver 6, a SIN output signal, which has a characteristic of sin θ×sin ωt as shown in FIG. 3B, and a COS output signal, which has a characteristic of cos θ×sin ωt as shown in FIG. 3C, are outputted from the resolver 6 and are respectively inputted to the comparators 21–23 of the timing section detecting circuit 71.

Figure 3D:
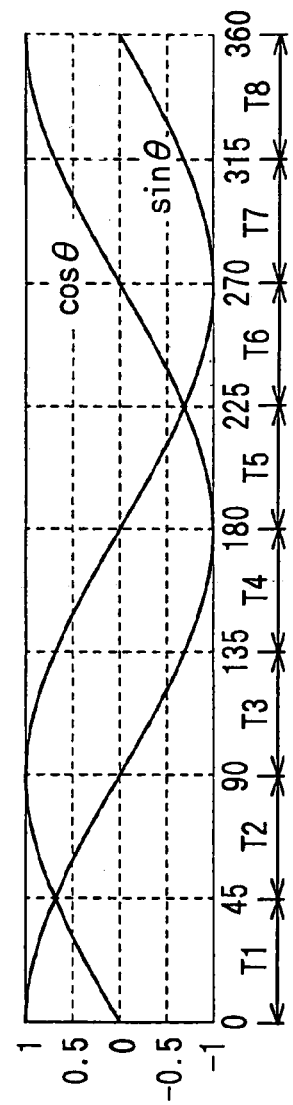

Incidentally, when the field exciting signal, sin ωt, becomes 1, the SIN signal becomes sin θ and the COS signal becomes cos θ, as shown in FIG. 3D. One cycle or 360 degrees in electric angle of the SIN and COS output signals is divided into 8 timing sections T1–T8 in order to compare magnitudes of two phase currents each section by a circuit that includes a plurality of comparators.

The comparator 21 provides H level signal (or 1) when the SIN signal is positive and provides L level signal (or 0) when the SIN signal is negative. The comparator 22 provides H level signal when the COS signal is positive and L level when the COS signal is negative. The comparator 23 provides H level signal when the SIN signal is larger than the COS signal and L level when the SIN signal is smaller than the COS signal. Thus, the comparators provide different signals each timing section as shown in FIG. 4. Because the combination of the level signals are different from others at the timing sections T1, T2, T5 and T6 except for the timing sections T3, T4, T7 and T8, the rotation direction can be detected at the timing sections T1, T2, T5 and T6.

When a steering wheel of a vehicle is to be turned right (torque direction of the brushless motor is right), the U-phase current and the V-phase current are supplied to the brushless motor as shown in FIG. 5A. On the other hand, the U-phase current and the V-phase current are supplied to the brushless motor as shown in FIG. 5B when the steering wheel of the vehicle is to be turned left (torque direction of the brushless motor is left). It was noted in FIGS. 5A and 5B, that the timing sections T2 and T6 have the following conditions: each of the phase-currents keeps positive or negative during the timing section; the magnitude relation between two phase-currents does not change during the timing section; and the difference in magnitude between two phase-currents is sufficiently large.

As shown in FIG. 2, the comparators 21, 22, 23 are connected to the AND circuits 24, 25 in the following manner. As shown in FIG. 4, when all the comparators 21, 22, 23 provide 1 at the timing section T2, the AND circuit 24 provides 1. On the other hand, the AND circuit 25 provides 1 when all the comparator 21, 22, 23 provide 0 at the timing section T6. Incidentally, the comparator 21 corresponds to Bit 0, the comparator 22 corresponds to Bit 1, and the comparator 23 corresponds to Bit 2. Thus, the timing sections T2 and T6 can be detected by the output signal of the AND circuits 24, 25.

The timing section detecting circuit 71 is connected to the latch circuit 74 that includes well-known D-flip-flop circuits 26, 27 that have a D terminal, a CL terminal and a Q terminal, as shown in FIG. 2. That is, the AND circuit 24 is connected to the D terminal of the flip-flop 26, and the AND circuit 25 is connected to the D terminal of the flip flop circuit 27. Whenever the field exciting signal sin ωt becomes 1, a pulse is inputted to the CL terminals of the flip-flop circuits 26, 27. Accordingly, the D-flip-flop respectively provide output signals at the Q terminals when and after the pulse is inputted to the CL terminals. When the timing is in section T2, the Q terminal of the flip flop 26 provides H level signal until another pulse is inputted to the CL terminal thereof. On the other hand, the Q terminal of the flip flop 27 provides H level signal until another pulse is inputted to the CL terminal thereof when the timing is in section T6. There is no possibility that both the flip-flops 26, 27 provide H-level signals at the Q terminals. The latch circuit 74 also receives output signals of the current detectors 4, 5, which are held until the field exciting signal sin ωt becomes 1 again.

The signals received by the latch circuit 74 are sent to the torque direction detecting circuit 75 to detect the torque direction of the motor 1. If the Q terminal of the flip-flop 26 is H-level, and the U-phase current is larger than the V-phase current, as shown in the timing section T2 of FIG. 5B, it is presumed that the steering wheel is turned left. On the other hand, it is presumed that the steering wheel is turned right if the Q terminal of the flip-flop 26 is H-level, and the U-phase current is smaller than the V-phase current, as shown in the timing section T2 of FIG. 5A.

In the same manner, if the Q terminal of the flip-flop 27 is H-level, and the U-phase current is larger than the V-phase current, as shown in the timing section T6 of FIG. 5A, it is presumed that the steering wheel is turned right. On the other hand, it is presumed that the steering wheel is turned left if the Q terminal of the flip-flop 27 is H-level, and the U-phase current is smaller than the V-phase current, as shown in the timing section T6 of FIG. 5B.

Figure 9:
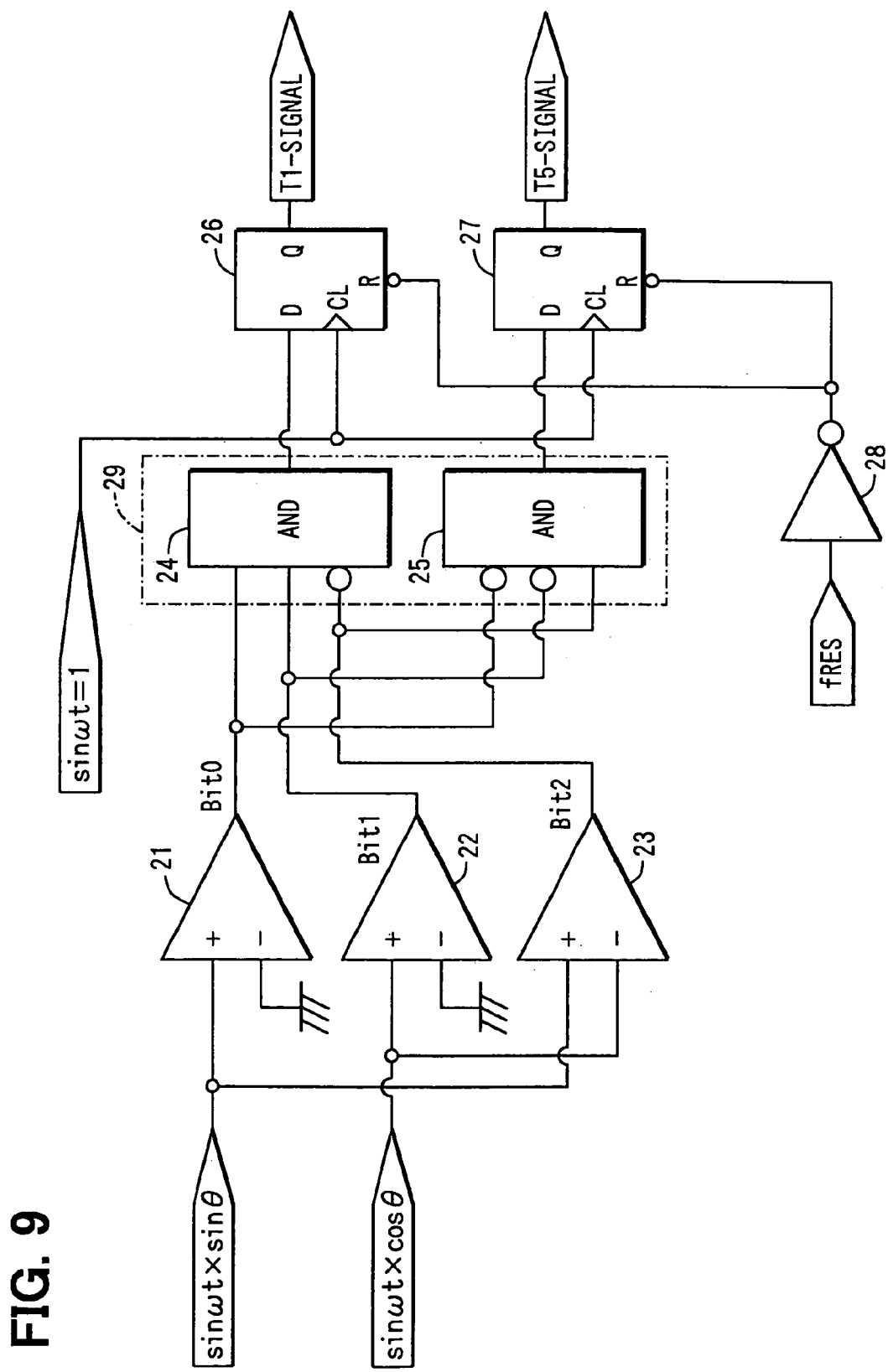
FIG. 9 is a schematic block diagram of a modification of the timing section detecting unit shown in FIG. 2.

The timing section detecting circuit 71 can be modified as shown in FIG. 9. In this circuit, the Bit 2 signal is inverted to be inputted to the AND circuit 24 and is not inverted to be inputted to the AND circuit 25. Accordingly, If the AND circuit 24 provides 1 (H level), it is presumed that the rotation angle of the motor is in the timing section T1. On the other hand it is presumed that the rotation angle of the motor is in the timing section T5, if the AND circuit 25 provides 1 (H level). Because the relationship between the U-phase current and the V-phase current is the same, the rotation direction of the steering wheel or the torque direction of the motor can be detected in the same manner as the former embodiment.

Incidentally, it would be possible to detect the rotation direction of the steering wheel or the torque direction motor in the four timing sections T1, T2, T5 and T6, in the same manner as described above.

Figure 7:
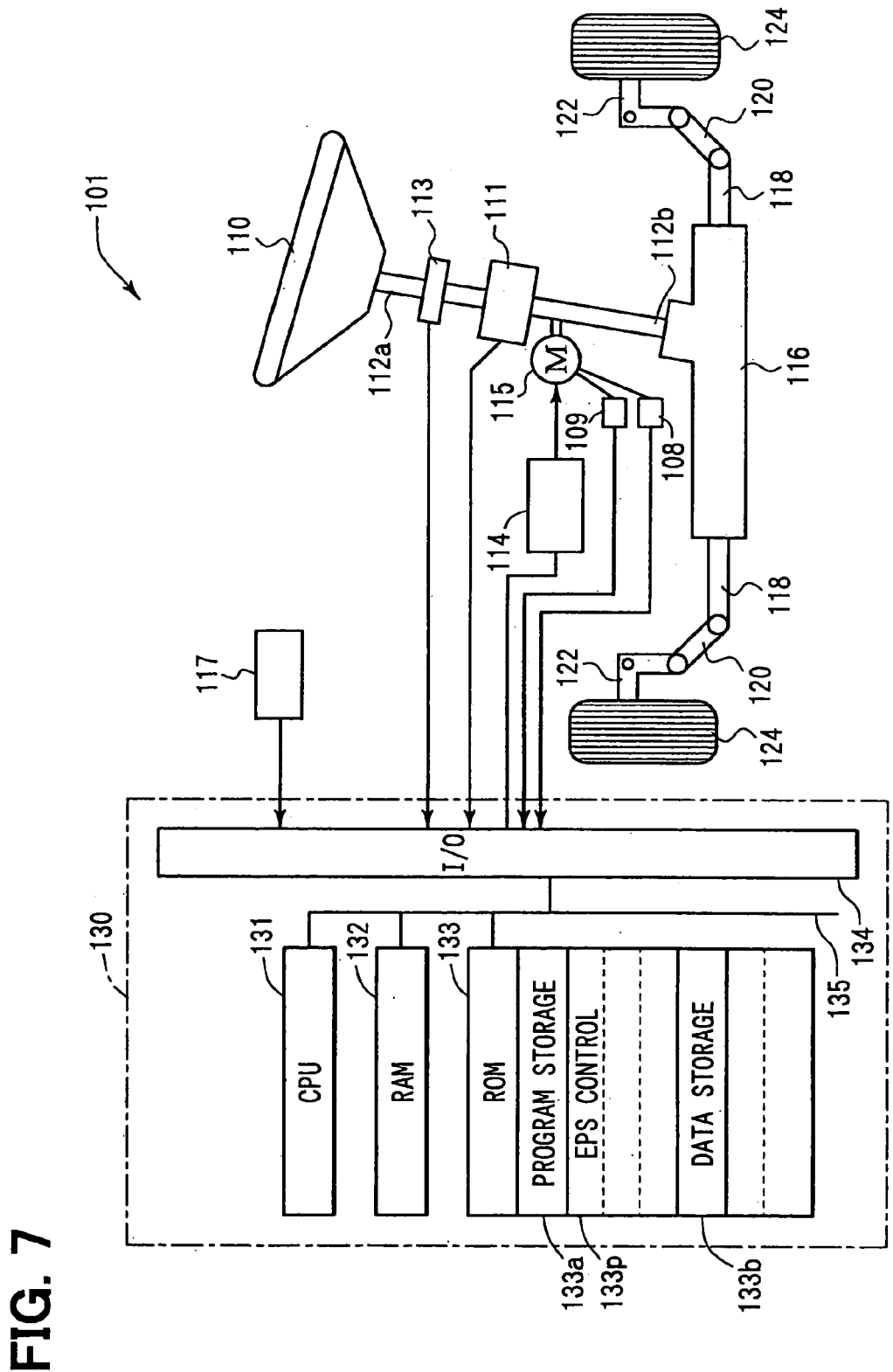
FIG. 7 is a schematic diagram illustrating a motor-driven power steering system to which a torque direction detecting device according to the invention is adopted.

A motor-driven power steering system 101 to which the above described torque direction detecting device is adopted will be described with reference to FIG. 7.

The motor-driven power steering system 101 includes a resolver 109, a steering wheel 110, a torque sensor 111, a steering shaft 112a connected to the steering wheel 110 at an upper end and to the torque sensor 111 at the other end, a pinion shaft 112b connected to the torque sensor 11 at an upper end, a steered angle sensor 113, a driver 114, a steering gear box 116 in which a pinion (not shown) is disposed to be connected to the other end of the pinion shaft 112b, a rack bar 118 in engagement with the pinion, an electric motor 115 connected to the pinion shaft via a gear (not shown) to the pinion shaft 112b, a pair of tie-rods 120, a pair of knuckle arms 122 fixed to a pair of front wheels of a vehicle and a steer control unit 130. Incidentally, the electric motor 115 can be disposed around one of the rack bars 118.

The steer control unit 130 includes a well-known type CPU 131, RAM 132, ROM 133, an I/O-interface 134 and a bus line 135 that electrically connects these components. The CPU 131 carries out control according to programs and data stored in the ROM 133 and the RAM 132. The ROM 133 includes a program storage section 133a and a data storage section 133b. The program storage section 133a stores an EPS control program 133p, and the data storage section 133b stores data for carrying out the EPS control program 133p. The CPU 131 calculate a command torque for the motor 115 to output according to a torque detected by the torque sensor 111 and a steered angle detected by the steered angle sensor 113. Then, the CPU 131 supplies the motor 115 via the motor driver 114 with a voltage to provide a suitable torque. In the meantime, the rotation angle of the motor 115 is detected by the resolver 109 to examine whether the motor 115 rotates at the calculated torque or not.

Figure 8:
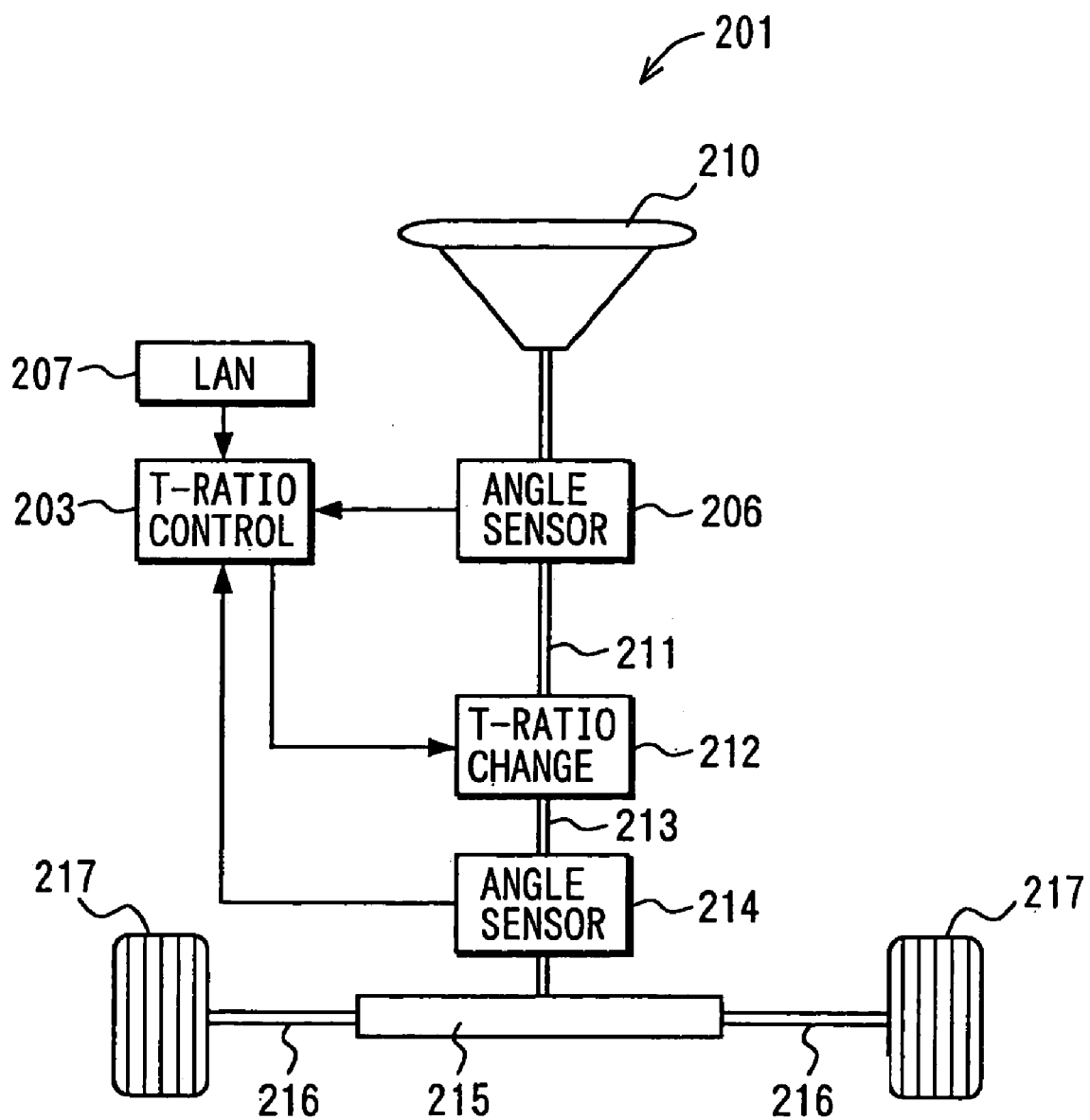
FIG. 8 is a schematic diagram illustrating a transfer ratio control system to which a torque direction detecting device according to the invention is adopted.

A transfer ratio control system 201 to which the above described torque direction detecting device is adopted will be described with reference to FIG. 8.

The transfer ratio control system 201 includes, a transfer ratio control unit 203, a steered angle sensor 206, a steering wheel 210, an input shaft 211 to which the steered angle sensor 206 is fixed, a transfer ratio changing unit 212, an output shaft 213 that has a pinion (not shown) at its lower end, an output angle sensor 214 fixed to the output shaft 213, a steering gear box 215, which accommodates the pinion, a pair of racks 216 that respectively engages the pinion. The steering gear box 215 also accommodates various components of a motor driven-power steering system. The output angle sensor 206 can be disposed in the transfer ratio changing unit 212. Each of the racks 216 is connected to a front wheel 217 of a vehicle via a tie rod and an arm. The steered angle of the input shaft 211 and the rotation angle of the output shaft 213 are respectively detected by the steered angle sensor 206 and the output angle sensor 214 and sent to the transfer ratio control unit 203, to which a vehicle speed signal, an engine rotation speed signal, etc. are also sent from outside via a LAN 207. The transfer ratio control unit 203 controls the transfer ratio changing unit 212 according to the above signals.

The transfer ratio changing unit 212 includes a brushless motor and a speed reduction mechanism, which are well-known. The transfer ratio changing unit 212 drives the brushless motor to change the rotation angle of the output shaft 213 under control of the transfer ratio control unit 203. In more detail, when a vehicle speed signal and an engine rotation speed signal are inputted to the transfer ratio control unit 203 via the LAN 207, the transfer ratio control unit 203 calculates a command rotation angle of the output shaft 213 from the inputted signals and provides a PWM (pulse width modulation) signal, which is sent to the transfer ratio changing unit 212. Consequently, the brushless motor give the front wheels 217 of the vehicle a steer angle that corresponds to a sum of the command rotation angle of the output shaft 213 and a rotation angle of the steering wheel 210. The steer angle of the front wheels is sensed by the output angle sensor 214 and fed back to the transfer ratio control unit 203 for its feed back control.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A torque direction detecting device for a brushless motor having a plurality of phase-windings comprising:
   a resolver for providing two sinusoidal signals having the same cycle and a phase different from each other by a prescribed electric angle according to rotation of the brushless motor;
   means for calculating an electric angle of the brushless motor from the two sinusoidal signals;
   a current sensor for detecting current flowing through the phase windings; and means for determining a torque direction of the brushless motor by comparing magnitudes of phase currents flowing through two of the phase-windings in a prescribed section of the electric angle, wherein said means for determining a torque direction comprises first means for comparing magnitudes of the phase currents flowing through two of the phase-windings to provide a signal when a difference in magnitude between the phase currents is in a prescribed magnitude relation and second means for providing a timing signal when the electric angle is in the prescribed section of the electric angle, and a logic circuit that provides a signal determining a torque direction when said second means provides the timing signal, and wherein the second means comprises a comparator circuit that directly compares the two sinusoidal signals and a circuit for examining whether the electric angle is in the prescribed section or not.

2. The torque direction detecting device as claimed in claim 1, wherein said means for determining torque direction compares magnitude of relation of the phase currents in two sections that are 180 degrees in electric angle different from each other.

3. A torque direction detecting device for an electric motor having a plurality of phase-windings comprising:

a resolver for providing a pair of a sin θ signal and a cos θ signal with θ changing from 0 degree to 360 degrees in electric angle according to rotation of the brushless motor;

means for calculating an electric angle of the brushless motor from the pair of the sin θ signal and the cos θ signal;

a current sensor for detecting phase current flowing through the phase windings; and means for dividing a period of the 360 degree-electric angle into a plurality of timing sections which includes same combinations of the magnitude relation between the sin θ signal and the cos θ signal, which is based on a direct comparison of the sin θ signal and the cos θ signal, and the comparison of the sin θ signal and the cos θ signal with 0; and means for determining a torque direction of the brushless motor if the phase currents flowing through two of the phase-windings is in a prescribed magnitude relation in a prescribed section of the timing sections which has a unique combination of the magnitude relation between the sin θ signal and the cos θ signal and the comparison of the sin θ signal and the cos θ signal with 0.

4. A torque direction detecting device for an electric motor having three phase-windings comprising:

a resolver for providing a pair of a sin θ signal and a cos θ signal with e changing from 0 degree to 360 degrees in electric angle according to rotation of the brushless motor;

means for calculating an electric angle of the brushless motor from the pair of the sin θ signal and the cos θ signal;

a current sensor for detecting phase current flowing through two of the phase windings;

means for dividing a period of the 360 degree-electric angle into 8 timing sections according to the magnitude relation between the sin θ signal and the cos θ signal, which is based on a direct comparison of the sin θ signal and the cos θ signal, and comparisons of the sin θ signal and the cos θ signal with 0; and means for determining a torque direction of the brushless motor if the phase currents flowing through two of the phase-windings is in a prescribed magnitude relation in one of prescribed sections of the 8 timing sections which has a unique combination of the magnitude relation between the sin θ signal and the cos θ signal and the comparison of the sin θ signal and the cos θ signal with 0.

5. The torque direction detecting device as claimed in claim 4, wherein the sections that have the unique combination have the following conditions:

each of the phase-currents keeps positive or negative during the timing section;

the magnitude relation between two phase-currents does not change during the timing section; and the difference in magnitude between two phase-currents is sufficiently large.

* * * * *